(12) United States Patent
Schechner et al.

(10) Patent No.: US 7,804,518 B2
(45) Date of Patent: Sep. 28, 2010

(54) ENHANCED UNDERWATER IMAGING (75) Inventors: Yoav Schechner, Kiryat Bialik (IL); Nir Karpel, Alonei Abba (IL)

(73) Assignee: Technion Research and Development Foundation Ltd., Technion, Senate Building, Haifa (IL)

( * ) Notice: Subject to any disclaimer, the term of this patent is extended or adjusted under 35 U.S.C. 154(b) by 0 days.

(21) Appl. No.: 10/588,127

(22) PCT Filed: Feb. 13, 2005

(86) PCT No.: PCT/IL2005/000180

§ 371 (c)(1),
(2), (4) Date: Jul. 31, 2007

(87) PCT Pub. No.: WO2005/076736

PCT Pub. Date: Aug. 25, 2005

(65) Prior Publication Data

US 2007/0274604 A1    Nov. 29, 2007

Related U.S. Application Data

(60) Provisional application No. 60/544,194, filed on Feb. 13, 2004.

(51) Int. Cl.
*H04N 7/18* (2006.01)
(52) U.S. Cl. .................... 348/81; 348/135; 348/140; 348/139; 348/159; 359/889; 359/885; 382/255; 382/106
(58) Field of Classification Search ............... 348/81, 348/139, 140, 135, 159, 143, 47, 58; 359/885, 359/889; 382/106, 255
See application file for complete search history.

(56) References Cited

U.S. PATENT DOCUMENTS

| 5,719,715 | A | * | 2/1998 | Westhaver | ............ 359/885 |
| 5,809,161 | A | * | 9/1998 | Auty et al. | ............ 382/104 |
| 5,826,113 | A | * | 10/1998 | Nonaka | ............ 396/25 |
| 6,267,051 | B1 | * | 7/2001 | Feldman et al. | ............ 101/171 |
| 6,470,097 | B1 | * | 10/2002 | Lai et al. | ............ 382/255 |

OTHER PUBLICATIONS

Ortiz, A., Simo, M., Oliver, G. "A Vision System for an Underwater Cable Tracker", Machine Vision and Applications, vol. 13, Nov. 3 / Jul. 2002.
Skerry, B. and Hall, H. "Successful Underwater Photography", Nov. 1, 2002 New York: Amphoto Books, pp. 25-41.

(Continued)

*Primary Examiner*—Shawn An
(74) *Attorney, Agent, or Firm*—Pearl Cohen Zedek Latzer, LLP (57) ABSTRACT

A method for enhancing underwater imaging affected by image degradation effects, the method comprising: acquiring at least one image of an underwater scene using an imaging device; determining information regarding distances of parts of the scene relative to the imaging device; and reconstructing an image of the underwater scene using a physics-based mathematical model, compensating image characteristics influenced by distance-dependent underwater degradation effects including veiling light, using the information on the distances of parts of the scene from the imaging device, and compensating distance-dependent underwater degradation effects relating to the distance of illumination sources from the scene.

17 Claims, 7 Drawing Sheets

OTHER PUBLICATIONS

Gilbert, G.D. and Pernicka, J.C. "Improvement of Underwater Visibility by Reduction of Backscatter with a Circular Polarization Technique", App. Opt pp. 741-746 vol. 6, Apr. 1, 1967.

Lythgoe, J.N. and Hemmings, C.C., "Polarized Light and Underwater Vision", Nature, pp. 893-894 vol. 213, Mar. 1967.

Denes, L.J., Gottlieb, M., Kaminsky, B. and Metes, P., "AOTF Polarization Difference Imaging", Proc. SPIE Advances in Computer-Assisted Recognition, pp. 106-115 vol. 3584, Oct. 14, 1998.

Rowe, M.P., Pugh, Jnr. E.N., Tyo, J.S., and Engheta, N., "Polarization-Difference Imaging: A biologically Inspired Technique for Observation Through Scattering Media", Optics Letters, pp. 608-610 vol. 20, Iss. 6., Mar. 15, 1 995.

Chang, .P.Y., et al "Improving Visibility Depth in Passive Underwater Imaging by use of Polarization", App. Opt. 2003, pp. 2794-2802 vol. 42, Iss 15., May 20, 2003.

McGlamey, B.L., "A Computer Model for Underwater Camera System", Proc. SPIE, 1979, pp. 221-231, vol. 208.

Mobley, C.D., "Light and Water: Radiative Transfer in Natural Waters", San-Diego Academic Press, 1994, Ch. 3,5.

Jagger, W.S. and Muntz, W.R.A., "Aquatic vision and the modulation transfer properties of unlighted and diffusely lighted natural waters", Vision Research, pp. 1755-1763, vol. 33. Issue 13, Sep. 1993.

International Search Report for International Application No. PCT/IL2005/000180 mailed Jul. 7, 2008.

* cited by examiner

ENHANCED UNDERWATER IMAGING

CROSS-REFERENCE TO RELATED APPLICATIONS

This application is a National Phase Application of PCT International Application No. PCT/IL2005/000180, International Filing Date Feb. 13, 2005, claiming priority of U.S. Provisional Patent Application, 60/544,194, filed Feb. 13, 2004.

FIELD OF THE INVENTION

The present invention relates to imaging. More particularly, the present invention relates to enhanced underwater imaging.

BACKGROUND OF THE INVENTION

Underwater vision is plagued by poor visibility conditions. Direct employment of most computer vision methods (e.g., those based on stereo triangulation or on structure from motion) underwater is difficult. This is due to the particularly challenging environmental conditions, which complicate image matching and analysis. It is important to alleviate these visibility problems, since underwater imaging is widely used in scientific research and technology. Computer vision methods are being used in this mode of imaging for various applications (see, for example, A. Ortiz, M. Simo, and G. Oliver, "A vision system for an underwater cable tracker," in Machine Vision and Applications, vol. 13, pp. 129-140, 2002) such as mine detection, inspection of underwater power and telecommunication cables, pipelines, nuclear reactors, and columns of offshore platforms. Underwater computer vision is also used commercially to help swimming pool life-guards. As in conventional computer vision, algorithms are sought for navigation and control of submerged robots. In addition, underwater imaging is used for research in marine biology, archaeology and mapping. Moreover, underwater photography is becoming more accessible to the wider public.

What makes underwater imaging so problematic? Underwater, visibility degradation-effects vary as distances to the objects increase. Since objects in the field of view (FOV) are at different distances from the camera, the causes for image degradation are spatially varying. Contrary to this fact, traditional image enhancement tools, e.g., high pass filtering and histogram equalization are typically spatially invariant. Since they do not model the spatially varying distance dependencies, traditional methods are of limited utility in countering visibility problems.

A common approach to improve underwater visibility and color is based on artificial illumination. The most popular realization of this approach (see, for example, B. Skerry and H. Hall, *Successful Underwater Photography*. New York: Amphoto books, 2002, pp. 25-41) uses an off axis wide-field strobe attached to the camera. A significant problem associated with this is the falloff of scene irradiance with the distance from the strobe. Moreover, "sea snow" may be created by the defocus blur of the strong backscatter from suspended particles at close distances.

To bypass the backscatter problem, advanced research underwater imaging systems use specialized active radiation hardware (see, for example, G. D. Gilbert and J. C. Pernicka, "Improvement of underwater visibility by reduction of backscatter with a circular polarization technique," *App. Opt.*, vol. 6, pp. 741-746, 1967). Yet, the range of such systems is limited, for the reason mentioned with respect to a wide field torch: at some distance the source's falloff leads to too low levels of scene irradiance. Such systems tend to be highly power consuming, complex and expensive. These problems are avoided by passive computer vision which exploits natural illumination. When available, natural illumination exists all over the scene, alleviating the need to project energy towards objects.

It was demonstrated decades ago (J. N. Lythgoe and C. C. Hemmings, "Polarized light and underwater vision," *Nature*, vol. 213, pp. 893-894, 1967) that polarization filtering can enhance contrast in passive underwater vision. Yet, using the raw result of simple optical filtering may have a limited effect, indicating that some post processing is needed, based on acquisition of both components of polarized light. One approach is based on a simple subtraction of the differently polarization filtered images (see, for example, L. J. Denes, M. Gottlieb, B. Kaminsky, and P. Metes, "AOTF polarization difference imaging," in *Proc. SPIE Advances in Computer-Assisted Recognition*, vol. 3584, 1999, pp. 106-115) or displays the degree of polarization (DOP) (for example, M. P. Rowe, E. N. Pugh, Jr., J. S. Tyo, and N. Engheta, "Polarization-difference imaging: a biologically inspired technique for observation through scattering media," *Optics Letters*, vol. 20, pp. 608-610, 1995). That approach has fundamental disadvantages. It assumes that polarization is associated with the object radiation, rather than the causes for the degradation of this signal. However, due to depolarization, that assumption becomes invalid as distances increase.

Our approach is based on physics-based model that accounts for degradation effects that depends of the object distance (from the camera and the light source), and on optical phenomena that are associated with these effects. In particular, we exploit the fact polarization can be associated with the prime visibility disturbance, which we wish to remove (veiling light). The association of polarization to veiling light has recently been utilized in an attempt to enhance visibility in a limited setting where illumination was perpendicular to the line of sight (LOS) (see P. C. Y. Chang, J. C. Flitton, K. I. Hopcraft, E. Jakeman, D. L. Jordan, and J. G. Walker, "Improving visibility depth in passive underwater imaging by use of polarization," *App. Opt*, vol. 42, pp. 2794-2802, 2003). That method used ad-hoc processing. Such enhancement methods are far from inverting the image formation process and recovering the objects. In contrast, our approach inverts the general physical model, thus the recovered image is similar to clear visibility appearance.

It is a purpose of the present invention to provide a novel method and system for enhancing underwater imaging.

BRIEF DESCRIPTION OF THE INVENTION

There is thus provided, in accordance with some preferred embodiments of the present invention, a method for enhancing underwater imaging affected by image degradation effects, the method comprising:

acquiring at least one image of an underwater scene using an imaging device; determining information regarding distances of parts of the scene relative to the imaging device;

reconstructing an image of the underwater scene using a physics-based mathematical model, compensating image characteristics influenced by distance-dependent underwater degradation effects including veiling light, using the information on the distances of parts of the scene from the imaging device, and compensating distance-dependent underwater degradation effects relating to the distance of illumination sources from the scene.

Furthermore, in accordance with some preferred embodiments of the present invention, the image characteristics comprise at least one of the characteristics group consisting of: contrast, color, sharpness, brightness.

Furthermore, in accordance with some preferred embodiments of the present invention, compensating distance-dependent underwater degradation effects relating to the distance of illumination sources from the scene comprises compensating effects attributed to the underwater depth of the scene.

Furthermore, in accordance with some preferred embodiments of the present invention, compensating effects attributed to the underwater depth of the scene comprises whitebalancing. Furthermore, in accordance with some preferred embodiments of the present invention, the physics-based mathematical model comprises an inversion of an image-formation model including backscatter.

Furthermore, in accordance with some preferred embodiments of the present invention, the invention includes regularization.

Furthermore, in accordance with some preferred embodiments of the present invention, the image-formation model that is inverted is approximated such that the approximation error is not discernible.

Furthermore, in accordance with some preferred embodiments of the present invention, acquiring of at least one image of the underwater scene comprises acquiring at least two images in different imaging conditions.

Furthermore, in accordance with some preferred embodiments of the present invention, said at least two images are acquired in different resolution.

Furthermore, in accordance with some preferred embodiments of the present invention, acquiring at least two images in different imaging conditions comprises acquiring at least two images of the scene in different polarizing states on the imaging device.

Furthermore, in accordance with some preferred embodiments of the present invention, acquiring said at least two images comprises acquiring said at least two images simultaneously.

Furthermore, in accordance with some preferred embodiments of the present invention, the reconstructed image comprises three-dimensional rendering of the scene.

Furthermore, in accordance with some preferred embodiments of the present invention, the information regarding distances of parts of the scene relative to the imaging device is used to reconstruct a distance map of the scene.

Furthermore, in accordance with some preferred embodiments of the present invention, the imaging device comprises a camera.

Furthermore, in accordance with some preferred embodiments of the present invention, the imaging device comprises at least two cameras.

Furthermore, in accordance with some preferred embodiments of the present invention, determining of information regarding distances of parts of the scene relative to the imaging device comprises extracting the information from said at least one image.

Furthermore, in accordance with some preferred embodiments of the present invention, there is provided a system for enhancing underwater imaging affected by image degradation effects, the system comprising:

an imaging device adapted to acquire at least one image of an underwater scene using an imaging device;

a processing unit for determining information regarding distances of parts of the scene relative to the imaging device and for reconstructing an image of the underwater scene using a physics-based mathematical model, compensating image characteristics influenced by distance-dependent underwater degradation effects including veiling light, using the information on the distances of parts of the scene from the imaging device, and compensating distance-dependent underwater degradation effects relating to the distance of illumination sources from the scene.

BRIEF DESCRIPTION OF THE DRAWINGS

FIG. 6b illustrates placement of a polarizer externally to the imaging device to minimize the effect shown in FIG. 6a.

FIG. 7b illustrates a spherical dome concentric with the center of projection that eliminates the effects shown in FIG. 7a.

DETAILED DESCRIPTION OF THE INVENTION AND PREFERRED EMBODIMENTS

In this work we develop a physics-based approach for recovery of visibility when imaging underwater scenes, preferably in natural illumination. Since it is based on the models of image formation, the approach automatically accounts for dependencies on object distance, and facilitates retrieving a distance map of the scene as a by-product. The method presented is fast to perform, and according to a preferred embodiment of the present invention relies on raw images taken through different states of a polarizing filter. These raw images have slight photometric differences with respect to one another. The differences serve as initial cues for our algorithm factoring out turbidity effects. It is interesting to note that marine animals too use polarization for improved vision.

To demonstrate the approach, we have built an underwater polarization imaging system composed of both custom and off-the-shelf components (the considerations for selecting the components are described hereinafter). We used the method for experimenting at sea. Significant improvements of contrast, color and visibility range are obtained by the approach of the present invention.

The intensity and color of each scene point essentially depend two unknown pointwise characteristics: the albedo of the object point and the distance to that point. The multiple acquisitions of the scene, say through the polarizing filter enables our algorithm to solve for the object intrinsic appearance as well as for the object distance. Note that in principle the method of the present invention may be applied to a single image taken, if the distances of different parts of the scene from the imaging device and illumination sources are known, are measured or are estimated.

Figure 1:
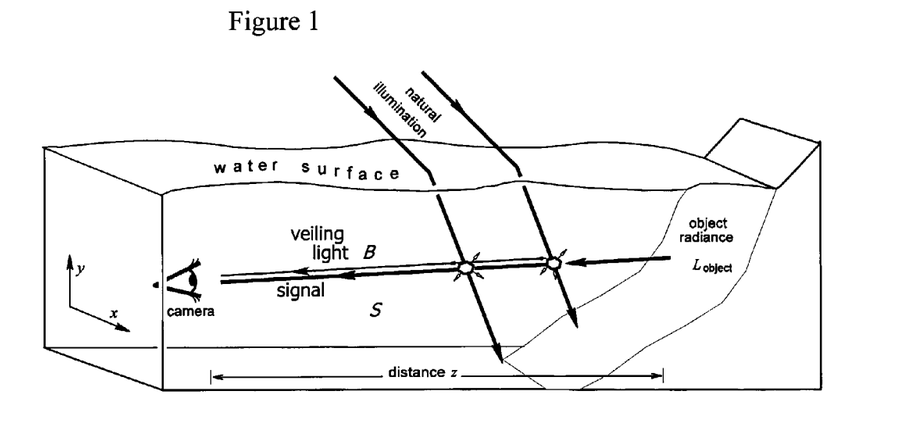
FIG. 1 illustrates imaging characteristics of an underwater scene.

As depicted in FIG. 1, when imaging underwater we sense two sources. The first source is the scene object at distance z, whose radiance is attenuated by absorption and scattering in the water. It is also somewhat blurred. The image corresponding to this degraded source is the signal. The second source is the ambient illumination. Part of the ambient light is scattered towards the camera by the particles in the water, and is termed in the literature as veiling light, path radiance, space-light and backscatter. The veiling light is partially polarized. This fact is used in our preferred visibility restoration algorithm. We now describe each of these components.

The signal is composed of two components, termed direct transmission and forward scattering. As a light ray progresses from the object towards the camera, part of its energy is lost due to scattering and absorption. The fraction which does reach the camera is the direct transmission (3), given by $$D(x,y) = L_{object}(x,y) e^{-cz} \quad (1)$$

where z is the distance to the object, which depends on the pixel coordinates x and y, while c is the attenuation coefficient. Here $L_{object}$ is the object radiance we would have sensed, had there been no scattering and absorption along the line of sight (LOS).

The attenuation coefficient is given by $c = a + b$, where a is the absorption coefficient and b is the total scattering coefficient of the water. The scattering coefficient b expresses the ability of an infinitesimal water volume to scatter flux in all directions. Integrating over all solid angles $\vec{\Theta}$ $$b = \int_{\vec{\Theta}} b(\vec{\Theta}) d\Omega = 2\pi \int_0^\pi b(\theta) \sin(\theta) d\theta \quad (2)$$

where $\theta$ is the scattering angle relative to the propagation direction. The angular scattering coefficient $b(\theta)$ is sometimes referred to as the phase function. Note that the variables a, $b(\theta)$, c and $L_{object}$ are all functions of the wavelength $\lambda$.

The forward scattering component is similar to the direct transmission. However, it represents light scattered forward at small angles relative to the LOS. This creates image blur given by the convolution $$F(x,y) = D(x,y) * g_z(x,y) \quad (3)$$

where D is given by Eq. (1) and $g_z$ is a point spread function (PSF). The PSF is parameterized by the distance z, since the further the object, the wider the support of the blur kernel.

There are several models in the literature for the form of the underwater PSF (for example, B. L. McGlamery, "A computer model for underwater camera system," in *Proc. SPIE*, vol. 208, 1979, pp. 221-231). Since the PSF depends on the hydrosols suspended in the water, the models are typically parameterized by various empirical constants. For example, the model described by McGlamery (and others) is of the form $$g_z = (e^{-\gamma z} - e^{-cz}) F^{-1}\{G_z\} \text{ where } G_z = e^{-K z \omega} \quad (4)$$

where $K > 0$ and $\gamma$ are empirical constants, $F^{-1}$ is the inverse Fourier transform, and $\omega$ is the spatial frequency in the image plane. Note that $G_z$ is a low pass filter. The effective frequency "width" of $G_z$ is inversely proportional to z. This expresses the increase of spatial blur spread for distant objects. The constant $\gamma$ is limited to $|\gamma| \leq c$.

Accounting for both the direct transmission (1) and the forward scattering (3), we define the signal as $$S = D + F \quad (5)$$

We define an effective object radiance $L_{object}^{effective}$ as $$L_{object}^{effective} = L_{object} + L_{object} * g_z \quad (6)$$

It is a somewhat blurred version of $L_{object}$. From Eqs. (1,3,5), the signal is $$S = e^{-cz} L_{object}^{effective} \quad (7)$$

We claim that in practice the prime cause for underwater image degradation is not blur, but rather veiling light.

Veiling light does not originate from the object on the LOS. Rather, light coming from illumination sources is scattered towards the camera (FIG. 1). In particular, in natural illumination, the LOS is lit mostly from the water surface above. In addition, the LOS is illuminated by the sea bottom and by scattering particles in the surrounding water volume. Before integrating all the contributions, let us first analyze the effect of a single distant source on a horizontal LOS.

The source illuminates the particles on the LOS from a direction $\vec{r} = (\theta, \rho)$ relative to the LOS, with intensity $I^{source}$. The contribution of this source to the veiling light is (see B. L. McGlamery, "A computer model for underwater camera system," in Proc. SPIE, vol. 208, pp. 221-231, 1979)

$$B(\vec{r}) = \int_0^z b(\theta) I^{source}(\vec{r}) e^{-cl} [1 - f/(l + l_0)]^2 dl \quad (8)$$

where f is the focal length of the camera and $I_0$ is the distance between the lens and the underwater housing port. This integral accounts for scattering into the LOS at some distance l, followed by attenuation until reaching the camera. It also accounts for geometric projection of the irradiance on the detector, via the ratio $f/(l+l_0)$.

Figure 2:
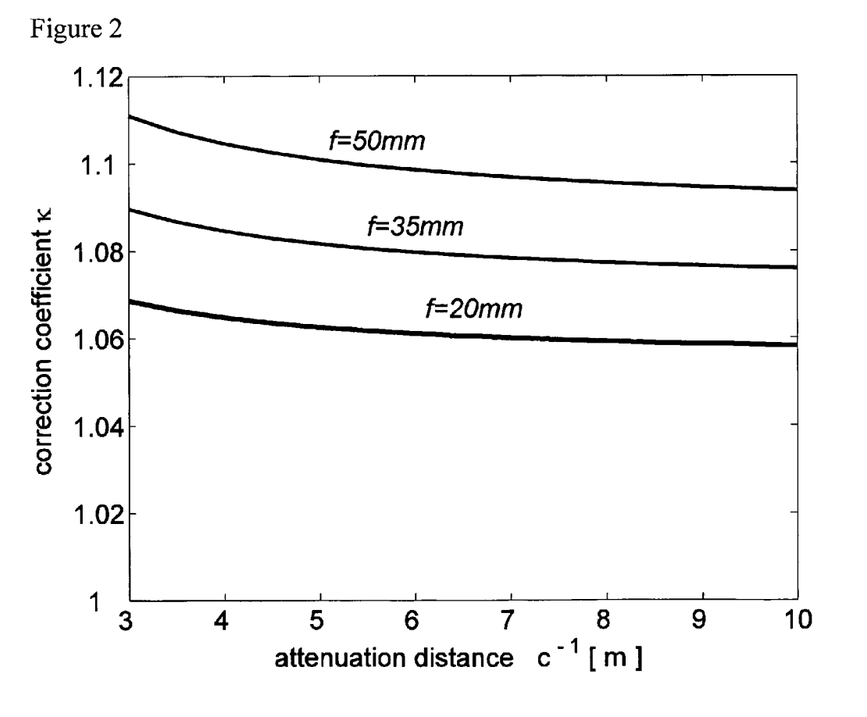
FIG. 2 is a plot showing numerical assessment of the correction coefficient as a function of focal length and attenuation coefficient.

It is now shown that we can considerably simplify the expression for veiling light, relative to Eq. (8). We can do this because typically $f/(c^{-1}+l_0) \ll 1$. Consider typical ranges of values as $c^{-1} \epsilon [3 \text{ m}, 10 \text{ m}]$, $f \epsilon [20 \text{ m}, 50 \text{ m}]$, $l_0 \approx 80$ mm, and object distance in the order of meters. We assessed the integral numerically. It is shown in FIG. 2 that to an accuracy of 99%, Eq. (8) can be written as $$B(\vec{r})_{approx} \approx k(f) b(\theta) I^{source}(\vec{r}) \int_0^z e^{-cl} dl \quad (9)$$

where the correction coefficient is given by $$k = \frac{B(\vec{r})_{approx}}{B(\vec{r})} \quad (10)$$

For instance, as shown in FIG. 2, a focal length of f=20 mm yields $k \approx 1.06$. Solving the integral in Eq. (9) yields $$B(\vec{r})_{approx} = B_\infty(\vec{r})(1 - e^{-cz}) \quad (11)$$

This close-form expression is much simpler than Eq. (8). It is easily seen that the farther that object, the larger the veiling light is. In Eq. (11), the variable $$B_4(\vec{r}) = k I^{source}(\vec{r}) b(\theta) \quad (12)$$

expresses the veiling light in a LOS which extends to infinity in the water. Summing up the contribution from light sources at all directions, the total veiling light is $$B(x,y) = \int_{\vec{r}} B(\vec{r})_{approx} d\vec{r} = B_\infty (1 - e^{-cz}) \quad (13)$$

where $$B_\infty \equiv \int_{\vec{r}} B_\infty(\vec{r})_{approx} d\vec{r} \quad (14)$$

is a scalar termed the water background, which depends on $\lambda$. The veiling light B implicitly depends on x and y due to its explicit dependence on the distance z.

Figure 3A:
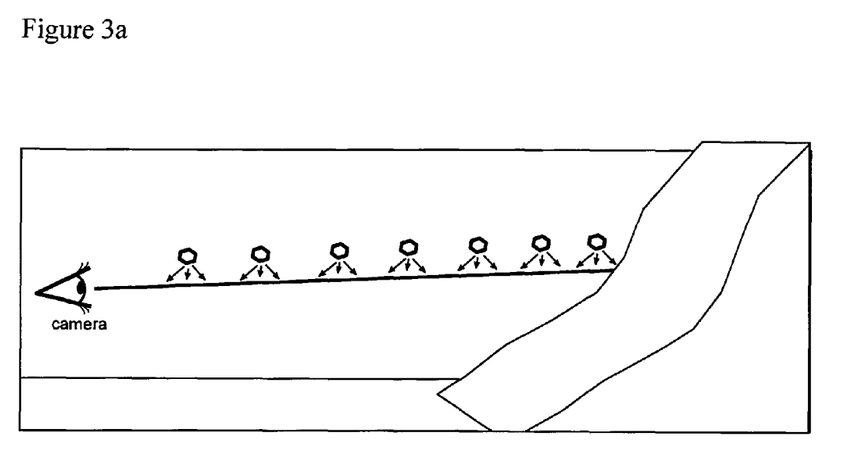
FIG. 3a and FIG. 3b depict scattering of light towards the Line of Sight (LOS) by particles close the LOS.
Figure 3B:
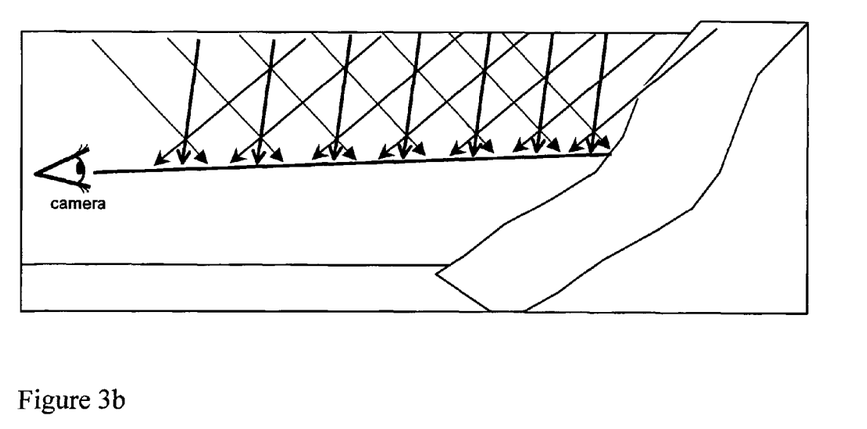

FIG. 3 depicts scattering of light towards the LOS by particles close the LOS. It shows that this light can be represented as originating from equivalent sources at infinity. This equivalence is based on an assumption of homogeneous lighting along the LOS. We believe that this is a reasonable assumption in horizontal photography in natural illumination. The reason is that underwater lighting naturally comes from a limited light cone around the zenith, and is thus typically unobscured along the LOS. Thanks to this equivalence, expression (13), which was developed for distant light sources is applicable to the general case of scattering from non-distant particles suspended in the water volume.

We now discuss the contribution of each of the above mentioned components. We performed a simulation of underwater imaging. The effects of water are simulated using a model for oceanic water (see C. D. Mobley, *Light and Water: Radiative Transfer in Natural Waters*. San-Diego Academic Press, 1994, ch. 3, 5), with a moderate concentration of hydrosols. Starting from an object radiance of $L_{object}$, we calculated $L_{object}^{effective}$, which accounts for blur by forward scattering (without attenuation and veiling light). We simulated the effects of varying distances by setting a spatially varying distance map to the scene. Incorporating veiling and attenuation effects as well as blur, the total image irradiance is $$I^{total} = S + B = e^{-cz} L_{object}^{effective} + B \quad (15)$$

The visibility strongly deteriorated at image $I^{total}$: even objects at moderate distances were swamped in a veiling light and become obscured. Veiling light affected the color and contrast of all objects.

We made a quantitative analysis of the simulated images. As a criterion for image quality, we look at contrast. The reason is that measurement of contrast underlies the determination of the modulation transfer function (MTF) of media. Contrast between two points v=1, 2 is usually defined as $|I_1 - I_2|/|I_1 + I_2|$, where $I_v$ is the intensity at point v. We generalize this definition, such that in a region having N pixels, we use $$C(I) = STD\{I_v\} \bigg/ \left( \sum_{v=1}^{N} I_v \right) \quad (16)$$

where STD $\{I_v\}$ is the standard deviation of the N intensity values. To calculate the contrast in a region of a color image having N pixels, we use $$C(I) = \frac{\sqrt{\frac{1}{N} \sum_{v=1}^{N} \sum_{\chi=red,green,blue} (I_v^\chi - \bar{I}^\chi)^2}}{\sum_{\chi=red,green,blue} \bar{I}^\chi} \quad (17)$$

where $\chi$ is an index of the chromatic channel, and $$\bar{I}^\chi = \frac{1}{N} \sum_{v=1}^{N} I_v^\chi \quad (18)$$

The contrast of the effective object $C(L_{object}^{effective})$ and the sensed image $C(I^{total})$ are calculated. Relative to the contrast of the original scene, the degradation of contrast Is $$\Delta_{object}^{effective} = \frac{C(L_{object}^{effective})}{C(L_{object})} \quad \Delta^{total} = \frac{C(L^{total})}{C(L_{object})} \quad (19)$$

Before inspecting these values, we define an image resulting from all degradation effects excluding blur.

$$\tilde{I}_{(no\_blur)}^{total} = e^{-cz} L_{object} + B \quad (20)$$

with a respective contrast degradation measure $$\Delta_{(no\_blur)}^{total} = \frac{C(\tilde{I}_{(no\_blur)}^{total})}{C(L_{object})} \quad (21)$$

The contrast degradation in the scene simulated scene was calculated as a function of distance. The resulting $\Delta_{object}^{effective}$ indicate that the effect of blur alone is not negligible, especially at long distances. Nevertheless, $\Delta_{(no\_blur)}^{total}$ indicate that the effect of the complementary processes is much more dramatic. While most of the contrast is maintained in $L_{object}^{effective}$, it is reduced by orders of magnitude by the veiling light, which increases while the signal is attenuated. We thus conclude that underwater veiling light is the dominant contributor to image degradation, rather than blur. This observation is consistent with experiments described in W. S. Jagger and W. R. A. Muntz, "Aquatic vision and the modulation transfer properties of unlighted and di.usely lighted natural waters," *Vision Research*, vol. 33, pp. 1755-1763, 1993.

Underwater scattering involves polarization effects. We exploit these effects to compensate for underwater visibility degradation. Let us describe the models for these effects. Consider a narrow source which illuminates the scattering particles residing on the LOS. The narrow source and the LOS from the camera to the object define a plane of incidence. We may divide the veiling light into two polarization components, that are parallel and perpendicular to this plane, $B^\parallel(\vec{r})$ and $B^\perp(\vec{r})$, respectively. Typically, $B^\perp(\vec{r}) > B^\parallel(\vec{r})$, i.e., the veiling light is partially polarized perpendicular to the plane. Moreover, if the illumination is done by an artificial source, the illumination can be fully polarized, for example it can be fully linearly polarized or circularly polarized. The intentional polarization of the source enables an increased polarization of the veiling light.

In general, irradiance of the LOS is not due to a narrow source. However, the LOS is generally illuminated in a highly anisotropic manner. In the particular case of natural underwater light, illumination originates from the sun and sky above the water. This light is restricted to cone around the zenith called the optical manhole or Snell's window. Scattering in the water leads to illumination of the LOS from other directions as well (e.g., from below and from the sides), but with lower intensity. Changes caused by this scattering to the angular irradiance distribution gradually depend of the underwater depth. As we go deeper under the water surface, the natural illumination reaches an asymptotic distribution, which is strongly peaked around the zenith.

Due to the anisotropy of the LOS irradiance, typical underwater natural veiling is significantly partially polarized. As depth increases, this polarization reaches an asymptotic value, which is maintained to infinite depth. The direction of polarization depends on the sun's bearing (unless it is occluded by clouds) and the viewing direction. However, this orientation typically tends to be approximately horizontal, for horizontal lines of sight.

Figure 4:
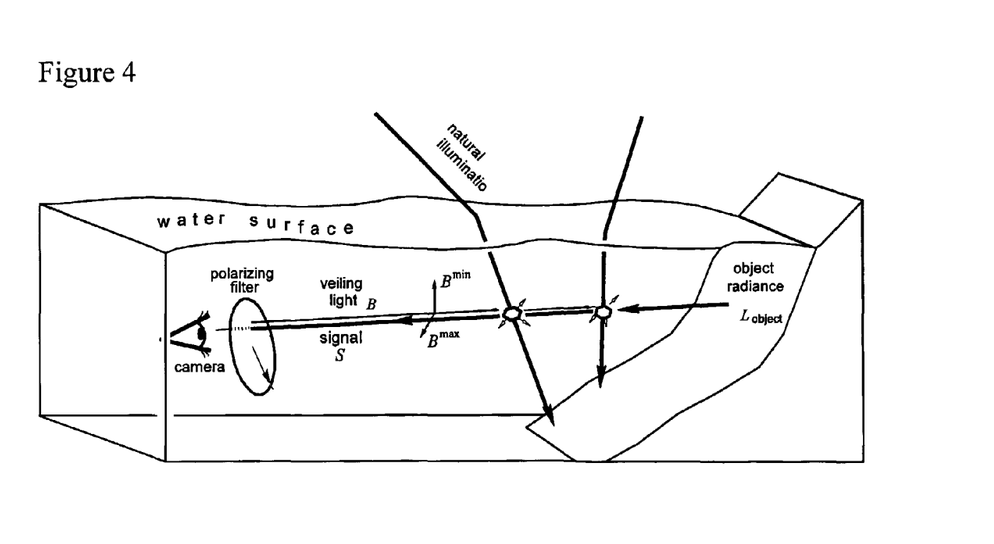
FIG. 4 illustrates imaging characteristics of an underwater scene through a polarizing filter.

In order to sense the different polarization components, we image the scene through a polarizing filter (FIG. 4). Since natural veiling is partially polarized, then its intensity depends on the state of this polarizing filter. In particular, if the veiling light is partially linearly polarized, as in natural lighting, the state of the filter is determined by the orientation of a polarizing filter around the optical axis. There are two orthogonal states of the polarizer for which the influence of the veiling light on the raw images reach extremum values $B^{max}$ and $B^{min}$. These are the two orthogonal components of the veiling light, i.e., $$B = B^{max} + B_{min} \quad (22)$$

where B is given by Eq. (13). The DOP of the veiling light is defined by:

$$p \equiv (B^{max} + B^{min})/B \quad (23)$$

Figure 5:
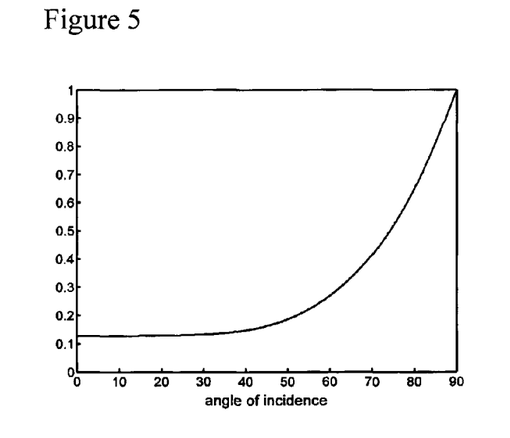
FIG. 5 plots the reflectance of glass in water, divided by this reflectance in air.

As for the signal S, we assume that it has insignificant influence on the polarization of the measured light, relative to the influence of the veiling light. Four reasons are listed for this assumption:

1. Light reflected from rough surfaces is naturally depolarized.
2. Contrary to reason 1, light reflected from specular dielectric objects may be highly polarized. However, underwater specular reflection is weaker than in air, since the refraction index of water is closer to that of the reflecting dielectric. As an example, FIG. 5 plots the reflectance of glass in water, divided by this reflectance in air. It shows that for almost all incidence angles, the specular reflection underwater is much weaker than in air.
3. Even if light emanating from the object is partially polarized, the signal polarization decreased as the distance to the camera increases. This is caused by multiple scattering along the LOS.
4. Even if the signal reaches the camera with substantial polarization, its influence is typically smaller than that of the veiling light. The reason is that the signal decreases (Eq. 7) while the veiling light (Eq. 13) increases with distance. Thus veiling light and its polarization dominate the measurements as distance increases. Therefore, the accuracy of the model increases where it is needed most—at distant objects, which are most affected by visibility degradation.

Nevertheless, note that this assumption may not hold at very close distances in a relatively good visibility, if the object strongly polarizes light. When the image areas corresponding to such objects are small, we detect and treat them by relying on the image content around them, using morphological and linear filtering.

We now describe the first part of our visibility restoration method: image acquisition. In particular, we describe our apparatus. When a polarizing filter is mounted, the sensed intensity at each image pixel changes as a function of the state of the filter (for linear polarizers it is their orientation angle). Similarly to veiling light, there are two orthogonal polarizer states corresponding to extremum values of the intensity, $I^{max}$ and $I^{min}$, where $$I^{total} = I^{max} + I^{min} \quad (24)$$

while $I^{total}$ is given by Eq. (15). Since we assume that the signal polarization is insignificant, the polarizer modulates only the veiling light. Therefore, the raw images corresponding to the extrema of the intensity measure are $$I^{max} = S/2 + B^{max} \text{ and } I^{max} = S/2 + B^{min} \quad (25)$$

Note that $I^{max}$ is the image taken at the "worst state" of the polarizer, where the disturbing veiling is maximal. On the other hand, $I^{min}$ is the image taken at the "best state" of the polarizer, where the disturbing veiling is minimal. For this reason, some past methods were based on simple acquisition of $I^{min}$. However, in most cases, $I^{min}$ is still a highly degraded version of $L_{object}$, where the degradation is spatially varying and is affected by the distance of the object from the camera and from the illumination source.

It is not necessary to use the minimum and maximum intensity values. Almost any two images (i.e., polarizer states) that modulate the veiling light may be used. Nevertheless, the extrema images provide the strongest modulation, yielding the most reliable outcome. The exception is when the two images have identical values, as occurs when a linear polarizer mounted on the camera is oriented at ±45° relative to the veiling light polarization.

In order to acquire the raw images, we built a custom system for underwater polarimetric imaging, which we term the Aqua-Polaricam. Several specifications determined its design, as detailed in the following. A camera was placed in a housing manufactured by Sealux, which is commercially available. We close the housing with a 120 mm dome port made of glass, while an inverted-circular polarizer was attached externally to it. The surrounding water flows to the space between the external polarizer and the dome, through several openings in the housing's interface to the polarizer mount. We use the Nikon D100 digital SLR camera, which enables extraction of raw output data. This data is linearly related to the scene radiance (i.e. the camera has no gamma correction in this mode) without automatic white balancing. We used a 20 mm wide angle Nikkor lens. The distance $I_0$ to the dome was 80 mm. Preliminary experiments revealed that stray light had entered the housing from its back viewing ports and then reflected into the lens. We thus blocked the stray light by slightly modifying the internal structure of the commercial housing.

We performed experiments by scuba diving and taking images using the system. At each scene, two photographs were taken to capture $I^{max}$ and $I^{min}$. For example, we scuba-dived at the Red-Sea (off Eilat, Israel) to a depth of 26 meters in an area containing coral reefs. The images acquired had a very low contrast, yet their slight mutual difference provided the key for substantial visibility improvement by a mathematical algorithm, described hereinafter.

The algorithm for improving underwater visibility overcomes the "veiling" effect caused by scattered light. For this reason, the adjective unveiled is used to describe the image resulting from the algorithm. In addition to compensating for the effect that arise from the distance of the object to the camera, it also compensates for the effect that arise from the distance of the object from the illumination source. A longer path from the illuminant to the object results not only in loss of brightness, but also in a color bias. The reason is attenuation of the illumination is a function of spectral bands. For example, in natural illumination in the open sea, as we go deeper underwater, the red portion of the illumination spectrum is absorbed by the water faster than the green-blue band. Compensating for this color bias is thus a very important step, that makes this problem unique, relative to methods that attempt improvement of visibility in the atmosphere (where the illumination color bias is usually marginal).

As mentioned hereinabove, space-invariant enhancement methods do not model the spatially varying distance dependencies of visibility problems. As a result, they are of limited utility. As an example of a naive space-invariant enhancement, let us consider a simplistic method for compensating the illumination blue color bias when photographing in natural lighting. Suppose we know that the sand in the diving site is rather white. If the scene does not include such a natural object, then a white target can be introduced to the scenery. Suppose that we normalize the color of the best-polarized raw image by the color of a sandy patch in the FOV:

$$I_{red}^{modified} = I_{red}^{raw}/I_{sand\_red}^{raw}$$

$$I_{green}^{modified} = I_{green}^{raw}/I_{sand\_green}^{raw}$$

$$I_{blue}^{modified} = I_{blue}^{raw}/I_{sand\_blue}^{raw} \qquad (26)$$

This multiplicative normalization does not compensate for the additive spatially varying veiling light. For this reason, the measured color values of a white patch $I_{sand\_red}^{raw}$, $I_{sand\_green}^{raw}$ and $I_{sand\_blue}^{raw}$ depend on the image coordinates x, y of the selected patch. Therefore, this compensation is ill defined. To disambiguate the process, we measure a patch that is as close as possible to the camera. This usually corresponds to the bottom of the photograph. At that place, the veiling is least intense, thus the value of the white patch best represents the illumination. Nevertheless, as mentioned above, Eq. (26) does not account for the additive spatially varying veiling light. Hence, the result will not perform a proper color compensation at varying distances, and will certainly not remove turbidity effects.

We now describe a mathematical algorithm, which solves the problem for the case of natural illumination and horizontal photography. The method inverts the visibility degradation effects including the color bias. Assume for a moment that we have an estimate of the global parameters $B_\infty$ and p. From Eqs. (22, 23, 25), the veiling light is estimated as $$\hat{B}(x,y) = [I^{max}(x,y) - I^{min}(x,y)]/p \qquad (27)$$

Inserting this estimate into Eqs. (13, 15, 24), we obtain an estimate for the object radiance $$\hat{L}_{object}^{effective}(x,y) = [I^{total}(x,y) - \hat{B}(x,y)]/\hat{t}(x,y) \qquad (28)$$

where $$\hat{t}(x,y) = 1 - \hat{B}(x,y)/B_\infty \qquad (29)$$

is the estimated water transmittance. The transmittance is related to the object distance z by $$\hat{t} = e^{-cz} \qquad (30)$$

Recall that all the variables in these equations are functions of the light wavelength λ. To account for the wavelength dependence, it is best to analyze the images with a fine spectral resolution. Each wavelength band can be analyzed independently. In our experiments, though, we used the traditional coarse wideband red, green, and blue (RGB) sampling of the spectrum. Therefore, the method is applied to every color channel separately.

The result of Eq. (28) is an estimate $L_{object}^{effective}$. Thus, it does not compensate for image blur, but only for the veiling effect of scattered light and for attenuation. If we wish, we can do make do with this estimate. The reason stems from the discussion above: veiling light is the prime reason for image contrast degradation, hence overcoming veiling light, rather than blur, is the prime step for recovering visibility. Alternatively, image "deblurring" can be performed (at the price of noise amplification). For deblurring, the distance-dependent blur kernel should be known. This may be done by the aid of the distance estimation described in the following.

Eqs. (27-29) invert the spatially varying visibility degradation effects that are associated with the object's position relative to the camera. This enables proper compensation for the color bias of the illumination. Assume that the illumination is uniform. Again, we use a patch of the scene, which we know should be white, if it were not for the illumination color (typically blue). However, we now perform the compensation over the image $\hat{L}_{object}^{effective}$:

$$\hat{L}_{red}^{modified} = \hat{L}_{object\_red}^{effective}/\hat{L}_{sand\_red}^{effective}$$

$$\hat{L}_{green}^{modified} = \hat{L}_{object\_green}^{effective}/\hat{L}_{sand\_green}^{effective}$$

$$\hat{L}_{blue}^{modified} = \hat{L}_{object\_blue}^{effective}/\hat{L}_{sand\_blue}^{effective} \qquad (31)$$

The result is scene recovery. The recovered image has a much improved contrast and color.

In addition to visual assessment of the results, we seek a quantitative measure of the performance of this method. We use the contrast criterion described in Eq. (17), and apply it to $I^{modified}$ defined in Eq. (26), to $\hat{L}^{modified}$ defined in Eq. (31), and to the best-polarized image $I^{min}$. Before applying Eq. (17), we contrast-stretched the brightness of each of these images, to occupy the full dynamic range. For better insight, we calculated the contrast at distinct image segments, corresponding to different ranges of object distances. For each distance, the contrast resulting from naive white balancing is similar to that of the raw image. This is contrary to the great improvement demonstrated in the recovered image.

We now analyze the sensitivity of the method to noise. Let the noise in the raw images be independent and having zero mean. Denote the STD of the noise in the raw images $I^{min}$ and $I^{max}$ as $\sigma_{I^{min}}$ and $\sigma_{I^{max}}$, respectively. The noise variance of the unveiled image is $$\sigma_{recovered}^2 = \left(\frac{\partial \hat{L}_{object}^{effective}}{\partial I^{min}}\right)^2 \sigma_{I^{min}}^2 + \left(\frac{\partial \hat{L}_{object}^{effective}}{\partial I^{max}}\right)^2 \sigma_{I^{max}}^2 \qquad (32)$$

Differentiating Eq. (28) and making use of Eqs. (27) and (29), $$\frac{\partial \hat{L}_{object}^{effective}}{\partial I^{max}} = \frac{1}{\hat{t}^2}\left[\left(1-\frac{1}{P}\right)\hat{t} + \frac{\hat{L}_{object}^{effective}\hat{t}}{pB_\infty}\right] \quad (33)$$

$$\frac{\partial \hat{L}_{object}^{effective}}{\partial I^{min}} = \frac{1}{\hat{t}^2}\left[\left(1+\frac{1}{P}\right)\hat{t} + \frac{\hat{L}_{object}^{effective}\hat{t}}{pB_\infty}\right] \quad (34)$$

Consider the case where the system noise is roughly determined by system quantization of the image irradiance to n bits. Then the noise STD of the raw images is equal to $$\sigma_{I^{min}} = \sigma_{I^{max}} = \sigma = 2^{-n} \quad (35)$$

where the dynamic range of the imaging system is normalized to 1. Inserting Eqs. (33-35) in Eq. (32), the STD of the recovered image is $$\sigma_{recovered} = \frac{\sigma\sqrt{2}}{\hat{t}}\sqrt{1+\frac{1}{P^2}\left(1-\frac{\hat{L}_{object}^{effective}}{B_\infty}\right)^2} \quad (36)$$

This noise depends on the recovered scene radiance $\hat{L}_{object}^{effective}$, thus somewhat complicating its analysis. Nevertheless, interesting insights can be drawn from this result. First, note that if the polarization of the veiling light is very low, i.e., p→0, then the recovery is very unstable. This is understandable, since low polarization does not convey significant information beyond a simple unpolarized image, and hence is not useful for reliable recovery. To contain the output noise (36), we may thus need to use in the recovery equations (27-29) a value of p which is slightly biased relative to the true one. Moreover, instability always occurs at pixels that correspond to large distances, where $\hat{t}$→0, since there the signal S may be lower than the system noise. Hence, $\hat{t}$ may need to be biased as well.

Accounting for the distance dependence of $\hat{t}$ in Eq. (30) and the dependence of noise on quantization bits (See Eq. 35), $$\sigma_{recovered} \propto e^{cz-n\ln 2} \quad (37)$$

The signal to noise ratio (SNR) decreases exponentially with the distance z. This is not a distinctive shortcoming of our polarization-based method. Rather, it is due to attenuation of the signal with the distance from the object, as is the case for other underwater imaging modalities. In methods based on artificial illumination, the SNR decreases even faster as a function of object distance. The reason is that the radiation is attenuated for approximately twice the object distance, beyond the $1/z^2$ falloff of the artificial illumination incident on the object, caused by free space propagation. Eq. (37) indicates that for a given level of output noise, the visibility range is proportional to the number of reliable camera bits. Thus, information from a 12-bit camera can recover objects that are 50% farther than those recoverable from data taken by an 8-bit camera, if quantization is an effective indication for the overall noise.

Noise can be reduced by spatial filtering, e.g., local averaging. Performing this directly on the raw images or on $\hat{L}_{object}^{effective}(x,y)$ would result in image blur, however there is a way to bypass this problem. Note that $\hat{B}(x,y)$ and $\hat{t}(x,y)$ do not vary rapidly across the FOV. The veiling light is typically a smooth function of spatial location, contrary to the rapid spatial variations of intensity and texture of the object $L_{object}$.

Thus spatial noise filtering of $\hat{B}(x,y)$ and $\hat{t}(x,y)$ does not blur $\hat{L}_{object}^{effective}(x,y)$, yet it decreases the noise in $\hat{L}_{object}^{effective}(x,y)$.

To perform the a polarization-based scene recovery, estimates of the global parameters $B_{28}$ and p are needed. These are intrinsic parameters of the water and lighting. These estimates are obtained by measuring a groups of pixels in the raw images. For example, they can be pixels corresponding to the water background, i.e., of objects so distant inside the water, that their signals are negligible due to attenuation. Let us denote these measured values by $\hat{p}$ and $\hat{B}_{28}$.

The value $\hat{p}$ obtained from direct measurement of image pixels should be slightly modified, for two reasons. The first is to limit instability. The second reason is the need to minimize the instances of negative pixel values. Negative pixel values stem from inaccurate measurement of $\hat{p}$ and $\hat{B}_\infty$ and due to image noise. From Eqs. (15, 27), $$\hat{S}(x,y) = \frac{\hat{I}^{total}(x,y)}{\hat{p}}[\hat{p}-\hat{P}(x,y)] \quad (38)$$

where $$\hat{P}(x,y) = \frac{I^{max}(x,y)-I^{min}(x,y)}{\hat{I}^{total}(x,y)} \quad (39)$$

is the DOP of the measured scene (i.e., the signal combined with the veiling light). If our estimate of the veiling light DOP is too low ($\hat{p}<p$), then negative values can appear in the image of the signal. This is especially relevant to distant objects, because P(x,y)→p when z→∞.

Both of these problems can be considerably alleviated with ease if we slightly bias $\hat{p}$ by multiplying it by a factor $\epsilon$, such that $1 \leq \epsilon \leq 1/\hat{p}$.

$$\hat{p} \rightarrow \epsilon\hat{p} \quad (40)$$

The increased $\hat{p}$ makes it less likely to encounter negative values in Eq. (38). In addition, the noise amplification becomes bearable. While it is clear from Eq. (36) that using a larger $\hat{p}$ decreases the noise, this is not the major contribution of this move, since we advocate using only a small bias. Rather, conditioning is obtained mainly thanks to the influence of this step on $\hat{t}$. As seen from Eqs. (27, 29), increasing p leads to an increase of $\hat{t}$. This eliminates the instances of $\hat{t}$→0 in Eq. (36). The noise in pixels corresponding to distant objects is then.

$$\sigma_{recovered}(z=\infty) = \sqrt{2}\sigma(1-1/\epsilon)^{-1} \quad (41)$$

Thus the unveiling process amplifies noise in pixels corresponding to distant objects, but this amplification decreases with the increase of $\epsilon$.

How does this bias affect the recovered intensity and color? It can be shown that when $\epsilon>1$, the estimated value of objects at infinity is $$\hat{L}_{object}^{effective}(z=\infty) = B_\infty \quad (42)$$

Thus, intensity and color of the raw unpolarized image are automatically retained in the recovered pixels at infinite distance. Thus, the result will have a bluish background, as is perceptually expected from an underwater image. In addition, the original raw value is retained at z=0 where $$\hat{L}_{object}^{effective}(x,y) = \hat{I}^{total}(x,y) \quad (43)$$

At all other distances, the inverse solution (Eq. 28) is moderated by weighting it with the "best polarized" raw image. By using a small value of $\epsilon>1$ the result is very similar to Eq. (28), but stabilized at the problematic pixels. This parameter offers the user a degree of freedom in deciding how aggressive the scene recovery should be. This is analogous to parameters used in standard regularization techniques, where typically a user-selected parameter trades a data-fitting term against an image-smoothness term. A benefit of this simple technique is that it does not impose blur for noise control, contrary to standard regularization. However, we do not claim this to be the optimal method for limiting noise amplification. We currently pursue further development of this issue. In our experiments we used $\epsilon=1.13$.

We now compare our results to prior methods that rely on natural illumination. First we discuss the standard image processing procedures of histogram equalization and unsharp masking. Then, we discuss prior polarization based methods. Both histogram equalization and unsharp masking are space invariant methods, and are therefore useful when contrast degradation is uniform across the raw image. As previously described, underwater the contrast loss is strongly affected by the distance and is therefore spatially variant. As shown here, the effectiveness of the standard image processing method is limited. Unsharp masking is a linear enhancement method in which the image Laplacian is added to the original image. This method sharpens the image, but only slightly improves the long-range visibility, while increasing noise. It is noted that unsharp masking can be applied to our recovered image, should we want to sharpen it in trade of noise. Histogram equalization of the raw image may improve the parts of scene, but on the other hand decrease the image quality in other parts. Furthermore, because the histogram of an image depends on the objects in the scene, the histogram of a partial frame image is different than that of the whole frame, leading to inconsistent results. Moreover, histogram equalization of color images is ill defined, and therefore colors are generally distorted by this operation, rather than being recovered.

The DOP and polarization difference imaging (PDI) methods are based on imaging through a polarizer. DOP and DPI use $I^{max}$ and $I^{min}$ differently than our method, and implicitly assume that polarization is associated with the signal rather than the veiling light, contrary to our method. In our experiment, these prior methods perform poorly, and do not recover the scenes at all, especially at long distances. Recently, a different equation was suggested to enhance underwater polarization images (see P. C. Y. Chang, J. C. Flitton, K. I. Hopcraft, E. Jakeman, D. L. Jordan, and J. G. Walker, "Improving visibility depth in passive underwater imaging by use of polarization," Applied Optics, vol. 42, pp. 2794-2802, 2003). That method is formulated for grayscale images, using ad-hoc formulation that does not resemble inversion of the image degradation process. The results of this formation have been unsuccessful in our experiments.

As a by-product of the radiance recovery process, we get an estimate of the distance map of the scene. From Eq. (30) the distance z is estimated as a function of (x,y) up to a global scale factor c, which is the attenuation coefficient. It is given by $$c\hat{z}(x,y) = -\ln[1-\hat{B}(x,y)/B_\infty] \tag{44}$$

If a transmissiometer is used, we can know what the attenuation coefficient c is. Nevertheless, even if c is unknown, we can quantitatively determine the relative distances in the scene. Thanks to the relative distance map, we can compare two image regions and determine that one of them is, say, three times as distant from the camera as the other one. Note that if we know the distance to a single point, we can set the scale of the relative distance map. We can then derive the absolute distance to any point in the scene, as well as the attenuation coefficient.

Analyzing the noise-sensitivity yields the noise STD of the recovered distance as $$\sigma_z = \frac{\sigma\sqrt{2}}{cpB_\infty}e^{cz} \tag{45}$$

Eq. (45) indicates that this noise is greatly amplified if $B_\infty \to 0$. This understanding helps us know which color bands are most reliable for the distance estimation. Recall that the illumination of scenes underwater typically suffers from low energy in the red portion of the spectrum, thus $B_\infty^{red} << B_\infty^{blue}$. Hence, the distance recovery at the blue portion of the spectrum can be expected to be more reliable. Therefore, in our experiments, we derived the relative distance maps using Eq. (44), based on the blue channel.

The recovered range map can be used to render the scene (recovered, raw or processed otherwise) from viewpoints other than the ones used during acquisition.

In our experiments, we used the estimated range map to create a 3D surface, and changed the viewpoint.

To summarize, we presented a method that can compensate for degradation effects occurring in underwater vision. The method is based on a simple analysis of one or more (in the example we used a pair on images from which information on the relative distances of different parts of the scene can be obtained (in the example we acquired this information through the use of a polarizing filter). Since it is physics-based, the method also recovers information about the scene structure (distances). The algorithm can exploits natural lighting.

The practical ability to see farther into the water with high clarity may change some of the common practices of underwater photography. Underwater photography has focused on very short distances using wide angle lenses or macro lenses. However, the practical ability to see farther through water turbidity enables zooming on distant objects. This aspect is particularly important in marine biology research, where close encounters may affect animal behavior.

Figure 6A:
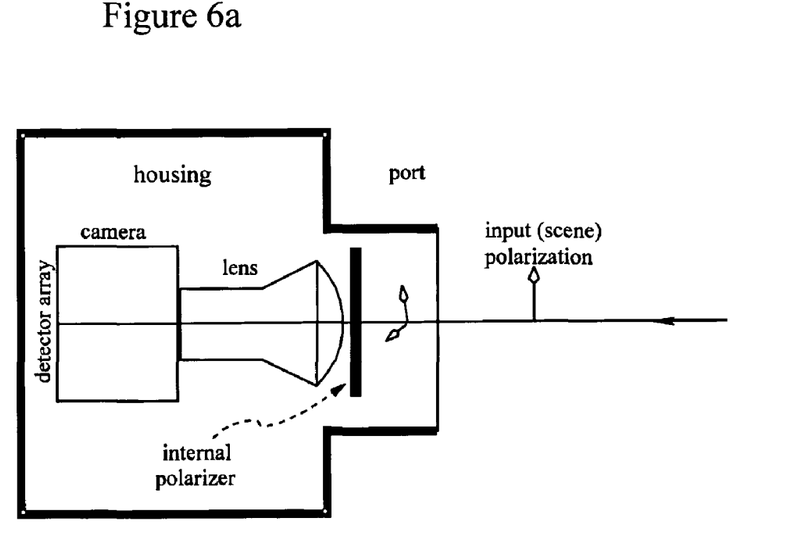
FIG. 6a illustrates an undesired effect, photoelasticity of the window of the imaging device that affects polarization.
Figure 6B:
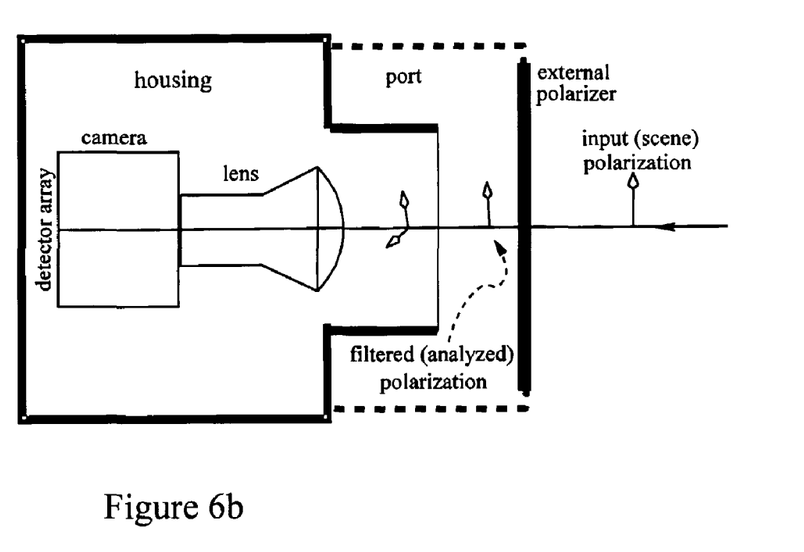

We describe hereinafter the experimental set up we used. Several considerations have dictated the configuration of our underwater imaging system. They arise since we make quantitative photometric measurements with the polarizer. For reduced noise in the scene radiance measurements, the camera should preferably have a linear radiometric response, besides being of low noise. For flexibility in acquisition, we used a system (camera and housing) having full control of the camera parameters (exposure time, aperture, etc.), while it is placed in a watertight housing. A polarizing filter can placed inside the housing, or outside. If the polarizer is inserted in the housing (FIG. 6a), this could spatially vary the transmittance though the polarizer, depending on □ and the polarization state, due to the photoelastic effect. Moreover, the effect may vary with the underwater depth, due to changes in the external water pressures. In principle, placing the polarizer externally should eliminate visible photoelastic effects. We thus decided to place the polarizing filter outside the housing. Consider FIG. 6b. The filter is the first optical component the light from the scene encounters as it enters the imaging system. The space between the external polarizer and the port is filled with the water coming from the surroundings. In practice, photoelastic visible effects are indeed greatly diminished. An additional step we took for minimizing this effect is to use a glass port.

Figure 7A:
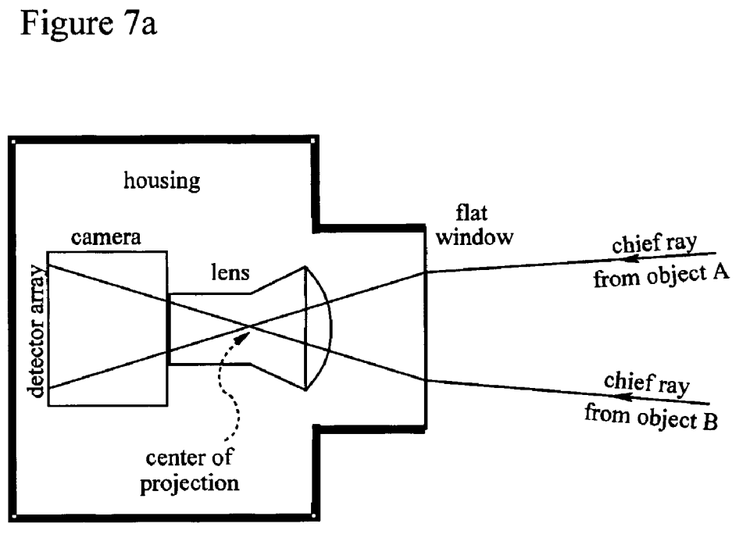
FIG. 7a illustrates an undesired effect: the transmittance of a flat window is polarization-dependent at oblique incidence.
Figure 7B:
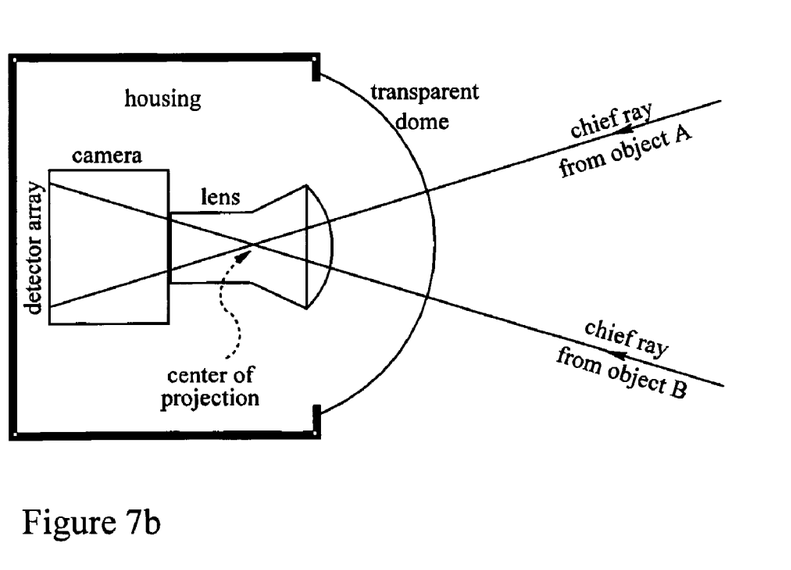
Figure 8:
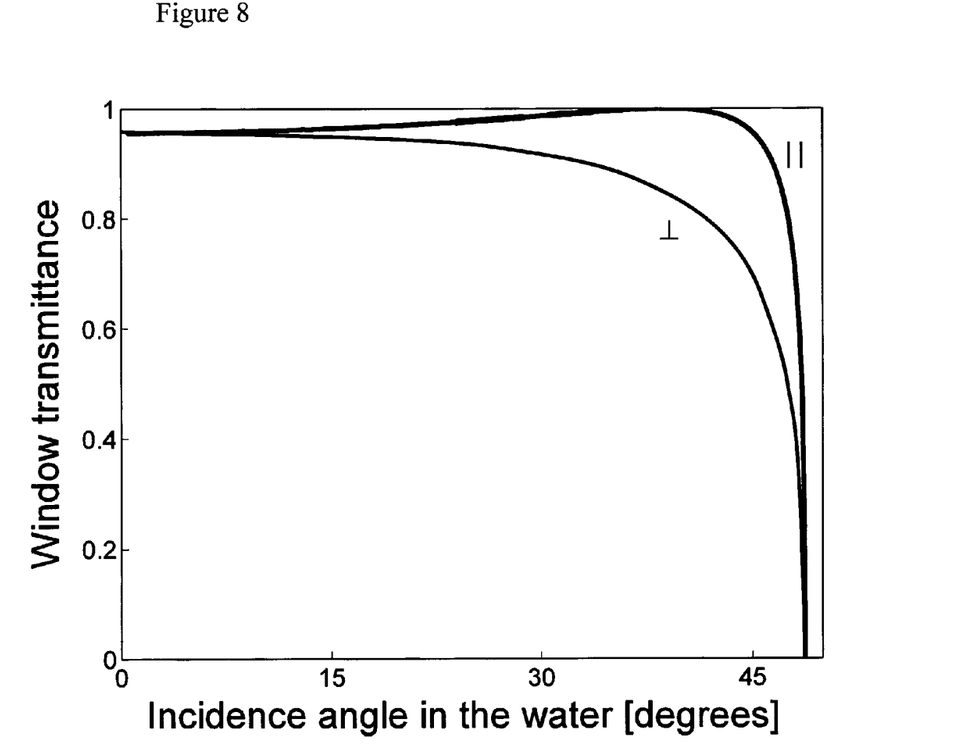
FIG. 8 illustrates a plot showing the transmittance of polarization components, derived from Fresnel's equations.
Figure 9:
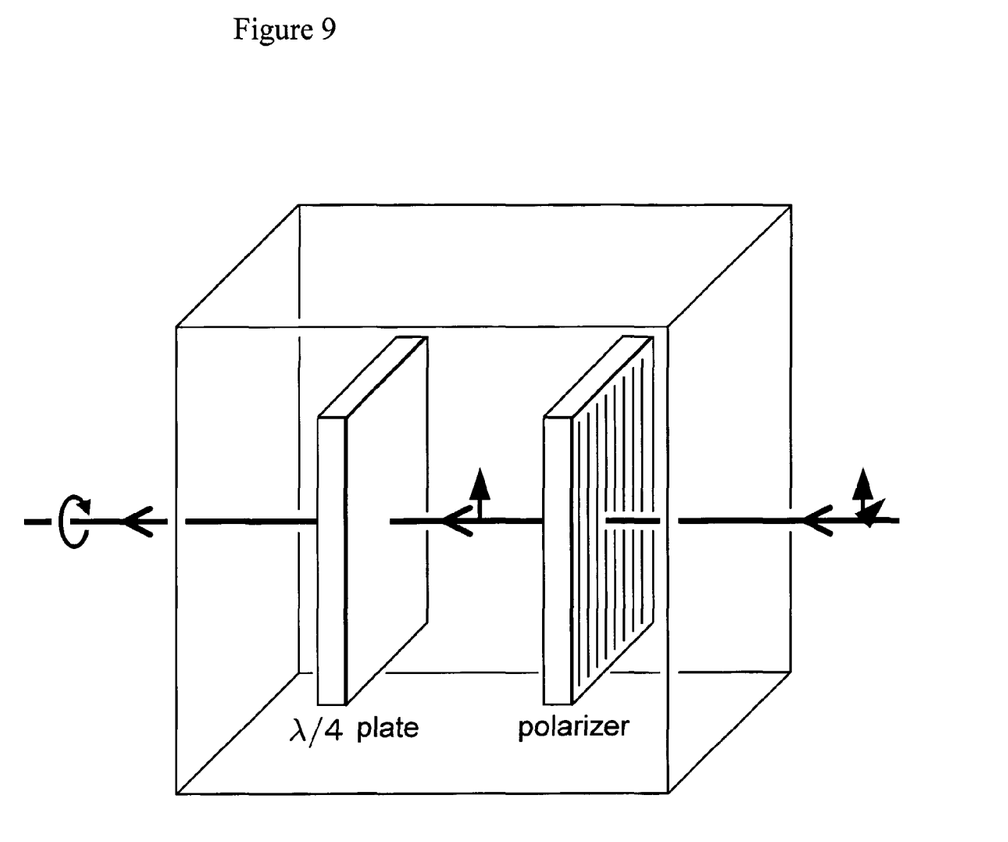
FIG. 9 illustrates an inverted circular polarizer.

Typical ports for underwater photography are either of dome shape, or flat. Consider FIG. 7a and FIG. 7b. The chief ray from an object point in the water to the detector undergoes an angular deviation at flat window interfaces. In this case, the window transmittance depends on the polarization of the passing light as can be derived from the Fresnel equations (FIG. 8). This polarization dependence distorts the intensity readouts and therefore affects the polarization estimation. However, knowing the geometry of the imaging system, this effect can be pre-calibrated and compensated for in post-processing. Dome ports, on the other hand, alleviate most of this problem during image acquisition. If the dome's center coincides with the center of projection of the camera, then the chief ray from an object point to the detector is normal to the dome interface. At normal incidence the transmittance is independent of the polarization state. For this reason, we decided to use a dome port. The effect of non-normal incidence can be further reduced by using an inverted circular polarizer in front of the port. An inverted circular polarizer (FIG. 9) is composed of a linear polarizer followed by a □/4 plate. It filters the polarization of its input (scene) while it outputs circular polarization to the port. In this case, the dome transmittance is invariant to the polarizer angle. We note that circular polarizers are tuned to normal incidence and to a narrow spectral band. Light outside that band or off axis creates elliptical polarization. The port transmittance of elliptical polarization is still less variant to the polarizer angle, than when light is partially linearly polarized.

Note that the above description of the experimental set up and technical considerations involved serves as an example, and in no way limits the scope of the present invention, as defined by the claims or their equivalents.

It should also be clear that a person skilled in the art, after reading the present specification could make adjustments or amendments to the attached Figures and above described embodiments that would still be covered by the following claims.

The invention claimed is:

1. An image processing method for enhancing underwater imaging affected by image degradation effects, the method comprising:
   acquiring at least one image of an underwater scene using an imaging device;
   determining attenuation of parts of the scene as acquired by the imaging device and determining the contribution of veiling light to said acquired at least one image, the attenuation and contribution of veiling light derived from said at least one image; and
   reconstructing an image of the underwater scene using a physics-based mathematical model, compensating image characteristics influenced by the attenuation and the veiling light degradation effects, and compensating underwater degradation effects relating to the optical path between illumination sources and different parts of the scene.

2. The method of claim 1, wherein the image characteristics are selected from a group of image characteristics consisting of: contrast, color, sharpness, and brightness.

3. The method of claim 1, wherein compensating underwater degradation effects relating to the optical path between illumination sources and the scene comprises white-balancing.

4. The method of claim 1, wherein the physics-based mathematical model comprises an inversion of an image-formation model.

5. The method of claim 4, wherein the inversion includes regularization.

6. The method of claim 4, wherein the image-formation model that is inverted is approximated such that the approximation error is not discernible.

7. The method of claim 1, wherein acquiring of at least one image of the underwater scene comprises acquiring at least two images in different imaging settings.

8. The method of claim 7, wherein said at least two images are acquired in different resolution.

9. The method of claim 7, wherein acquiring at least two images in different imaging conditions comprises acquiring at least two images of the scene in different polarizing states of the imaging device.

10. The method of claim 1, wherein acquiring said at least two images comprises acquiring said at least two images simultaneously.

11. The method of claim 1, wherein the reconstructed image comprises three-dimensional rendering of the scene.

12. The method of claim 1, wherein the determined attenuation of parts of the scene is used to reconstruct a distance map of the scene.

13. The method of claim 1, wherein the imaging device comprises a camera.

14. The method of claim 1, wherein the imaging device comprises at least two cameras.

15. The method of claim 1, further comprising determining the distances of the parts of the scene from the imaging device based on said at least one image.

16. The method of claim 1, wherein the step of determining attenuation of parts of the scene as acquired by the imaging device and determining the contribution of veiling light to said acquired at least one image is done using image data from said at least one image.

17. A system for enhancing underwater imaging affected by image degradation effects, the system comprising:
   an imaging device adapted to acquire at least one image of an underwater scene using an imaging device;
   a processing unit for determining attenuation of parts of the scene as acquired by the imaging device and determining the contribution of veiling light to said acquired at least one image, the attenuation and contribution of veiling light derived from said at least one image; and
   reconstructing an image of the underwater scene using a physics-based mathematical model, compensating image characteristics influenced by the attenuation and the veiling light degradation effects, and compensating underwater degradation effects relating to the optical path between illumination sources and different parts the scene.

* * * * *